(12) United States Patent
Schaal

(10) Patent No.: US 10,703,175 B2
(45) Date of Patent: Jul. 7, 2020

(54) AIR VENT

(71) Applicant: fischer automotive systems GmbH & Co. KG, Horb a.N. (DE)

(72) Inventor: Falk Schaal, Freudenstadt (DE)

(73) Assignee: fischer automotive systems GmbH & Co. KG, Horb A.N. (DE)

( * ) Notice: Subject to any disclaimer, the term of this patent is extended or adjusted under 35 U.S.C. 154(b) by 332 days.

(21) Appl. No.: 15/690,870

(22) Filed: Aug. 30, 2017

(65) Prior Publication Data

US 2018/0056756 A1    Mar. 1, 2018

(30) Foreign Application Priority Data

Sep. 1, 2016 (DE) .................. 10 2016 116 358

(51) Int. Cl.
*B60H 1/34* (2006.01)
*F24F 13/072* (2006.01)
*F24F 13/10* (2006.01)
*B64D 13/06* (2006.01)

(52) U.S. Cl.
CPC ......... *B60H 1/3421* (2013.01); *B60H 1/3414* (2013.01); *F24F 13/072* (2013.01); *F24F 13/10* (2013.01); *B60H 2001/3478* (2013.01); *B64D 2013/0625* (2013.01)

(58) Field of Classification Search
CPC .......... B60H 1/3421; B60H 2001/3478; F24F 13/072; F24F 13/10; B64D 2013/0625
USPC ....................................... 454/155
See application file for complete search history.

(56) References Cited

U.S. PATENT DOCUMENTS

| | | | |
|---|---|---|---|
| 8,951,102 B2 * | 2/2015 | Brancheriau | F24F 13/065 454/155 |
| 2008/0014855 A1 | 1/2008 | Leserre | |
| 2014/0357179 A1 | 12/2014 | Londiche et al. | |
| 2015/0273984 A1 | 10/2015 | Suzuki et al. | |
| 2016/0101668 A1 * | 4/2016 | Doll | F24F 13/072 454/155 |
| 2016/0250909 A1 * | 9/2016 | Schneider | B60H 1/3421 454/155 |

FOREIGN PATENT DOCUMENTS

| | | |
|---|---|---|
| CN | 1153112 A | 7/1997 |
| CN | 204222591 U | 3/2015 |
| CN | 104943629 A | 9/2015 |
| DE | 10 2007 019 602 B3 | 6/2008 |

(Continued)

OTHER PUBLICATIONS

German Search Report dated Mar. 28, 2017 for German Application No. 10 2016 116 360.0.

(Continued)

*Primary Examiner* — Edelmira Bosques
*Assistant Examiner* — Dana K Tighe
(74) *Attorney, Agent, or Firm* — Renner, Otto, Boisselle & Sklar, LLP

(57) ABSTRACT

An air vent for ventilating a passenger compartment of a motor vehicle and in which an air quantity control element is provided in an air divider, which can be moved selectively into one of two air ducts, into which the air divider divides the air vent. A ratio of air quantities that flow through the two air ducts determines an outflow direction out of the air vent.

9 Claims, 4 Drawing Sheets

(56) References Cited

FOREIGN PATENT DOCUMENTS

| | | |
|---|---|---|
| DE | 10 2009 048 677 A1 | 5/2010 |
| DE | 10 2013 210 053 B3 | 9/2014 |
| DE | 10 2013 210 055 B3 | 9/2014 |
| DE | 10 2015 205257 | 10/2015 |
| EP | 0412066 | 2/1991 |
| FR | 2772311 | 6/1999 |
| WO | WO-2015062890 A1 * | 5/2015 ........... B60H 1/3421 |

OTHER PUBLICATIONS

European Search Report for corresponding European Patent Application No. 17188223.6, dated Jan. 23, 2018.

* cited by examiner

AIR VENT

CROSS-REFERENCE TO RELATED APPLICATION

The present application claims priority under 35 USC § 119 to German Patent Application No. 10 2016 116 358.9, filed on Sep. 1, 2016, the entire disclosure of which is incorporated herein by reference.

TECHNICAL FIELD

The present disclosure relates to an air vent. Air vents are used for ventilating, heating and, if necessary, cooling a passenger compartment of a motor vehicle and are disposed, for example, in an instrument panel.

DESCRIPTION OF THE RELATED ART

The patent DE 10 2013 210 055 B3 discloses an air vent comprising a housing, which has a rectangular cross section and comprises a rectangular air inlet opening and a likewise rectangular air outlet opening. The housing of the known air vent expands in a flow direction downstream from the air inlet opening and subsequently tapers again in the direction of the air outlet opening. "Flow direction" means from the air inlet opening to the air outlet opening. In an expanded region, which includes the expanding and tapering region of the housing, the air vent comprises an air divider, which expands by way of an aerodynamic profile in the expanding region of the housing and tapers again in the tapering region of the housing. The air divider divides the housing of the air vent into two air ducts, each having the same flat cross section that remains the same in a flow direction, the cross sections initially extending apart from each other downstream from the air inlet opening in the expanding region and subsequently extending toward each other at a slant in the tapering region toward the air outlet opening. An air flow flowing through the air inlet opening into the housing of the air vent is divided by the air divider into two air flows through the two air ducts, which initially flow apart from each other and subsequently flow back toward each other at a slant, and so the air flows flow together at a slant at the air outlet opening or downstream therefrom and combine to form one common air flow.

At one end of the air divider facing the air inlet opening, the known air vent comprises a guide vane, which extends across a width of the housing and the air divider and is swivelable upward and downward, so that the guide vane alternatively blocks one of the two air ducts to a lesser or greater extent. In each of the end positions thereof, the guide vane completely blocks one of the two air ducts. By swiveling the guide vane, an air flow flowing through the air inlet opening into the housing of the air vent can be divided into the two air ducts, i.e., a ratio of the air quantities flowing through the two air ducts can be adjusted. Due to the air ducts extending toward each other at a slant toward the air outlet opening, the ratio of the air flows through the two air ducts determines a direction of the combined air flow after emergence from the air outlet opening of the air vent: a greater air quantity from one of the two air ducts deflects the common air flow, at a slant, downstream from the air outlet opening into the corresponding direction.

In order to deflect the air flow toward the side, the known air vent comprises jointly swivelable blades, which are disposed in parallel to each other and perpendicularly to the air divider, in the flow direction upstream from the guide vane.

SUMMARY

An object herein is to provide an alternative to air deflection transversely to the air divider of an air vent of the above-described type, which, in particular, allows for a more compact design.

This object is achieved as described herein. The air vent includes a housing having an air inlet opening and an air outlet opening. An air divider is disposed in the housing, which divides the housing into two air ducts, which extend toward each other at a slant in the direction of the air outlet opening and thereby determine a direction of a common air flow out of the air outlet opening perpendicular to the air divider or in the direction in which the two air ducts extend toward each other at a slant.

In order to be able to influence the direction of the common air flow out of the air outlet opening, the air vent includes an adjustable air quantity controller in at least one and preferably both air ducts. The air quantity controller is disposed, in the flow direction, not upstream from the air divider, but rather in the two air ducts into which the air divider divides the housing of the air vent. The air quantity controller can be accommodated, for example, in the air divider and can comprise one or multiple elements, which can be moved to a further or lesser extent in one air duct or in both air ducts. The air quantity controller controls, for example throttles, an air flow through one of the two air ducts or the air flows through both air ducts; the air quantity controller can also completely block one air duct or both air ducts. Since the two air ducts extend toward each other, at a slant, toward the air outlet opening, the ratio of the air quantities that flow through the two air ducts influences the direction in which the common air flow—formed by the combination of the air flows through the two air ducts— emerges from the air vent: A greater air quantity from one of the two air ducts deflects the common air flow at a slant into the corresponding direction.

The two air ducts, into which the air divider divides the housing, can extend up to the air outlet opening or terminate upstream therefrom. Preferably, the housing and/or the air ducts have internal cross sections that are wider transversely to the flow direction and in parallel to the air divider than the cross sections are high perpendicularly to the air divider. In particular, the housing and/or the air ducts have rectangular internal cross sections.

Embodiments provide a movable, for example swivelable and/or displaceable, air quantity control element as an air quantity controller or as part of the air quantity controller. Multiple movable air quantity control elements can also be present. In embodiments, the air quantity control element or elements are disposed in the air divider. The air quantity control element or elements can be, for example, sliding elements, flaps, or rudders, of a rudder type such as that of a horizontal or vertical tail or an aileron of an aircraft, which are movable out of the air divider into one air duct or into both air ducts. The list is an example and is not exhaustive. One embodiment provides one or more rotary vanes as air quantity control elements. A rotary vane is also conceivable in the flow direction through the air vent upstream from the air divider or at one end of the air divider facing the air inlet opening or at one end of the air divider facing the air outlet opening.

The above-described air quantity controller is used for controlling the common air flow out of the air outlet opening of the air vent transversely to the air divider, wherein the air does not flow out transversely, but rather at a slant, having one component in the flow direction and one component transverse to the flow direction and transverse to the air divider. The component transverse to the air divider is influenced by means of the air quantity controller.

In order to also be able to influence the outflow direction in parallel to the air divider, one embodiment provides an adjustable air guide device in one air duct or in both air ducts. The air guide device, which can comprise, for example, one or more flaps, or preferably jointly swivelable blades, can also be disposed in the flow direction upstream from, or downstream from, the air divider.

BRIEF DESCRIPTION OF THE DRAWINGS

The air vent is described in greater detail hereafter with reference to exemplary embodiments shown in the drawings. The figures show sectional views of four exemplary embodiments of air vents. The drawings are simplified depictions for ensuring an understanding of the air vents as described herein.

DETAILED DESCRIPTION

Figure 1:
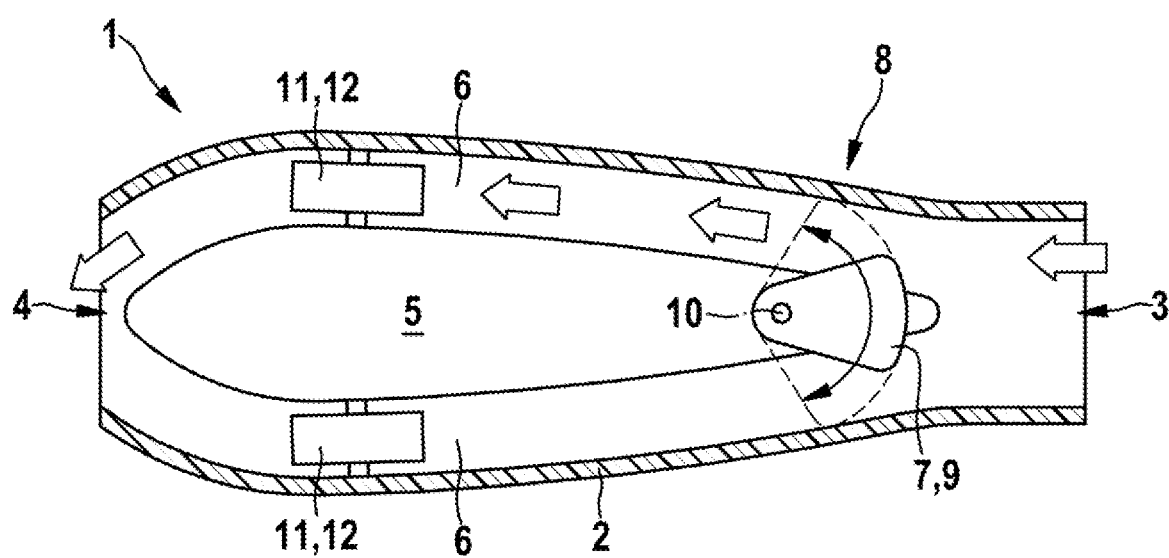
FIG. 1 shows a longitudinal cross section of an air vent in accordance with an embodiment described herein.

The air vent 1, which is depicted in FIG. 1, is provided for the ventilation, heating and, if necessary, cooling of a passenger compartment of a motor vehicle, which is not shown, and for installation in an instrument panel. The air vent 1 comprises a housing 2 having an air inlet opening 3 and an air outlet opening 4. The drawing shows a longitudinal cross section of the air vent 1, wherein "longitudinal cross section" means in the direction of a flow direction from the air inlet opening 3 to the air outlet opening 4. The housing 2, as well as the air inlet opening 3 and the air outlet opening 4, has a rectangular internal cross section transversely to the flow direction. Starting from the air inlet opening 3, the housing 2 initially has a constant rectangular cross section in a first longitudinal section, expands in a curved shape perpendicularly to the flow direction in an adjoining second longitudinal section and, in an adjoining third longitudinal section, tapers again toward the air outlet opening 4, the cross section of which is equal to or approximately equal to a cross section of the air inlet opening 3. The cross section of the housing 2 changes only with respect to the height; the width of the housing 2 is constant.

In an expanded region of the housing 2, which is to say, in the second and third longitudinal sections, the housing 2 comprises an air divider 5 fixedly disposed in the housing, which extends across the entire width of the housing 2. In the exemplary embodiment, the air divider 5 has a symmetrical airfoil profile, which is constant across the entire width of the housing 2, the pointed end of which facing the air inlet opening 3 and the round end of which facing the air outlet opening 4. An airfoil profile of the air divider 5 is not, however, necessary. The expanded region of the housing 2 is an enlargement, which is not to scale, of the airfoil profile of the air divider 5. The air divider 5 divides the housing 2 into two air ducts 6 having rectangular cross sections, which are constant in the direction of flow through the air vent 1. The described shape is examplary and not intended to be limiting for the air vent 1.

Corresponding to the shape of the housing 2 and the air divider 5, which initially expands in the flow direction and subsequently tapers again, the two air ducts 6 initially extend apart from each other and subsequently extend toward each other again, at a slant, toward the air outlet opening 4. Close to the end facing the air inlet opening 3, a movable air quantity control element 7 is disposed in a recess of the air divider 5. The air quantity control element 7 is located completely within the air divider 5, as viewed in the direction of flow through the air vent 1, at a small spacing from the end of the air divider 5 facing the air inlet opening 3. "Close" means that the air quantity control element 7, as viewed in the direction of flow through the air vent 1, is located in a region of the air divider 5 that extends from the end of the air divider 5 facing the air inlet opening 3 across approximately ¼ to ⅓ of a length of the air divider 5 in the flow direction.

The air quantity control element 7 can be moved out of the air divider 5 selectively into one of the two air ducts 6, and so the air quantity control element throttles an air flow through one of the two air ducts 6 and, in the end positions thereof, blocks one of the two air ducts 6 in each case. Embodiments comprising air quantity control elements 7 for each of the two air ducts 6 (not depicted) are also possible. The air quantity control element 7 forms an adjustable air quantity controller 8 of the air vent 1 or part of such an air quantity controller 8. A ratio of air quantities that flow through the two air ducts 6 can be controlled by means of the air quantity controller 8. Due to the air ducts 6 extending toward each other at a slant toward the air outlet opening 4, the ratio of the air quantities flowing through the two air ducts 6 determines a direction of an outflow of air out of the air outlet opening 4 of the air vent 1: a greater air quantity through one of the two air ducts 6 deflects a common air flow, formed by the combination of the air flows through the two air ducts 6, out of the air outlet opening 4 of the air vent 1 at a slant into the corresponding direction. The greater a difference is between the air quantities flowing through the two air ducts 6, the more intensively the common air flow out of the air outlet opening 4 is deflected toward the corresponding side. The air quantity controller 8 is located within the two air ducts 6, which is to say, within the second and the third longitudinal section of the housing 2, in which the air divider 5 divides the housing 2 into the two air ducts 6. In the exemplary embodiments, the air quantity controller 8 is located in the second longitudinal section, in which the housing 2 expands in the flow direction. The air quantity controller 8 is located, in the flow direction, neither upstream from nor downstream from the air divider 5.

In FIG. 1, the air quantity control element 7 is a profiled element 9 having a triangular profile remaining constant across the width of the air vent 1 and having curves instead of edges. A base side of the triangular profile faces the air inlet opening 3. The air quantity control element 7 is swivelable about a swivel axis 10, which extends in the direction of the width of the air vent 1, at the end thereof facing the air outlet opening 4. The air quantity control element 7 is illustrated in a neutral central position, in which the air quantity control element blocks both air ducts 6 partially and to equal extents. The air quantity control element can swivel into end positions illustrated using dashed lines, in each of which the air quantity control element completely blocks one of the two air ducts 6. The air quantity control element 7 is steplessly swivelable into every intermediate position between the two end positions.

In order to be able to deflect the common air flow out of the air outlet opening 3 of the air vent 1 at a slant in the direction of the width of the housing 2, the air vent 1 comprises blades 11, which are swivelable perpendicularly to the flow direction and perpendicularly to the width of the housing 2. The blades 11 are jointly swivelable in parallel in each air duct 6; the blades 11 can be swivelable jointly or separately in the two air ducts 6. The air flows in the air ducts 6 can be deflected at a slant in the direction of the width of the housing 2 by swiveling the blades 11, which is to say, the common air flow out of the air outlet opening 3 of the air vent 1, which is formed by the combination of the air flows through the two air ducts 6, is also deflected at a slant in this direction. The blades 11 form an air guide device 12, by means of which the air flow out of the air outlet opening 4 of the air vent 1 can be deflected at a slant toward the side, which is to say, in the direction of the width of the housing 2. The common air flow out of the air outlet opening 3 of the air vent 1 can be deflected in all directions, which is to say, upward, downward, to the left and to the right, with the aid of the air quantity divider 8 and the blades 11.

Figure 2:
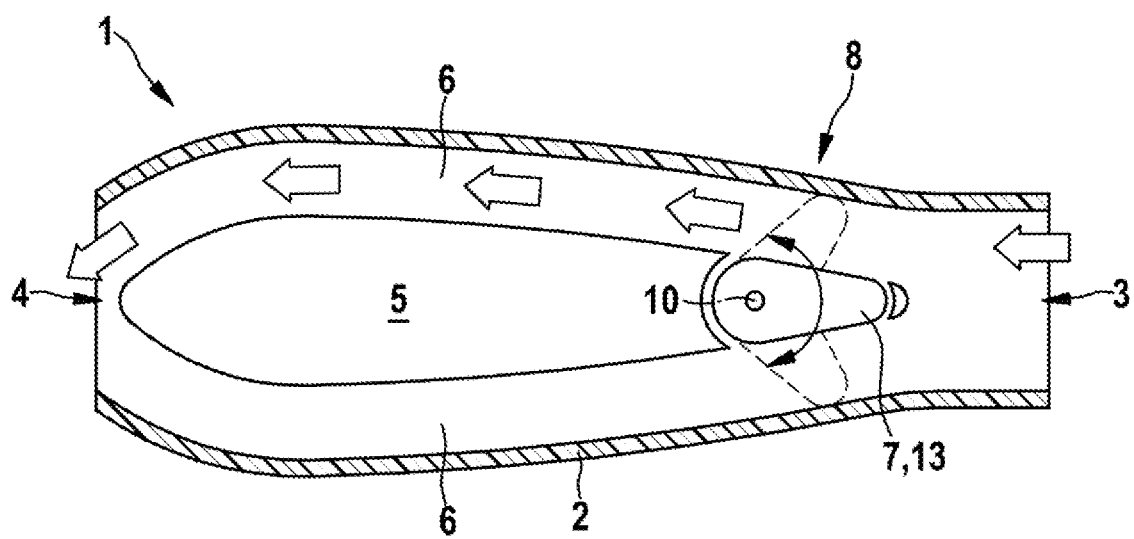
FIG. 2 shows an air vent in accordance with another embodiment.

In FIG. 2, the air quantity control element 7 of the air quantity controller 8 is designed as a strip-shaped air guide flap 13, which is disposed in a recess of the air divider 5, close to the end facing the air inlet opening 3 of the air vent 1, as is the case for the profiled element 9 in FIG. 1. As is the case for the profiled element 9 in FIG. 1, the air guide flap 13 in FIG. 2 is swivelable about a swivel axis 10, which extends in the direction of the width of the air vent 1, at the end of the air guide flap 13 facing the air outlet opening 4. The ratio of the air quantities flowing through the two air ducts 6 is controlled in the manner described above with reference to FIG. 1, which deflects the common air flow out of the air outlet opening 4 of the air vent 1 into the corresponding direction.

In contrast to FIG. 1, no blades are disposed in the air ducts 6 of the air vent 1 in FIG. 2, but such blades are also possible in FIG. 2.

For the rest, the air vent 1 in FIG. 2 is designed in the same manner and functions in the same way as the air vent 1 in FIG. 1. The same reference numbers are used in the two figures for identical components. With respect to the description for FIG. 2, reference is additionally made to the descriptions for FIG. 1.

Figure 3:
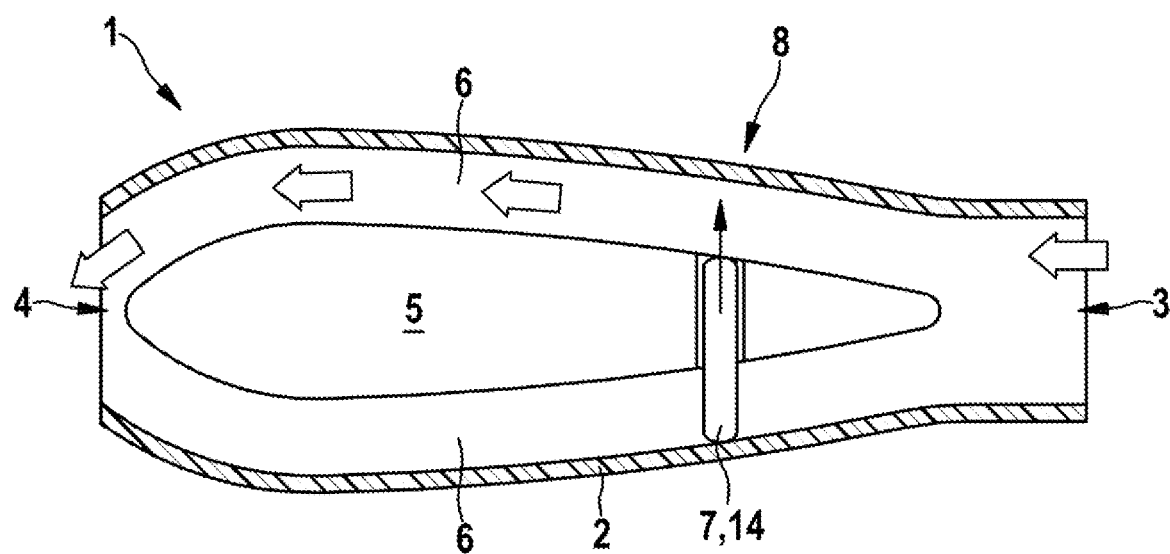
FIG. 3 shows an air vent in accordance with yet another embodiment.

In FIG. 3, the air quantity controller 8 comprises a sliding element 14 as an air quantity control element 7. The sliding element 14 is strip-shaped and is disposed in a recess of the air divider 5 and extends across the entire width of the housing 2. It is situated perpendicularly to the flow direction and is displaceably guided in the air divider 5 perpendicularly to the flow direction. Sliding element 14, in the end positions thereof, blocks one of the two air ducts 6 and, in intermediate positions, the sliding element partially blocks both air ducts 6, wherein displacement of the sliding element 14 enlarges one air passage and thereby increases the air quantity through one of the two air ducts 6, and simultaneously reduces the air quantity through the other air duct 6.

In FIG. 3, no blades are depicted in the air ducts 6, although blades 11 can be present, as in FIG. 1. For the rest, the air divider 1 in FIG. 3 is designed in the same manner as the air divider 1 in FIGS. 1 and 2 and functions in the same way. Identical components are provided with the same reference numbers in all of the figures and, with respect to the description of FIG. 3, reference is additionally made to the descriptions for FIGS. 1 and 2.

Figure 4:
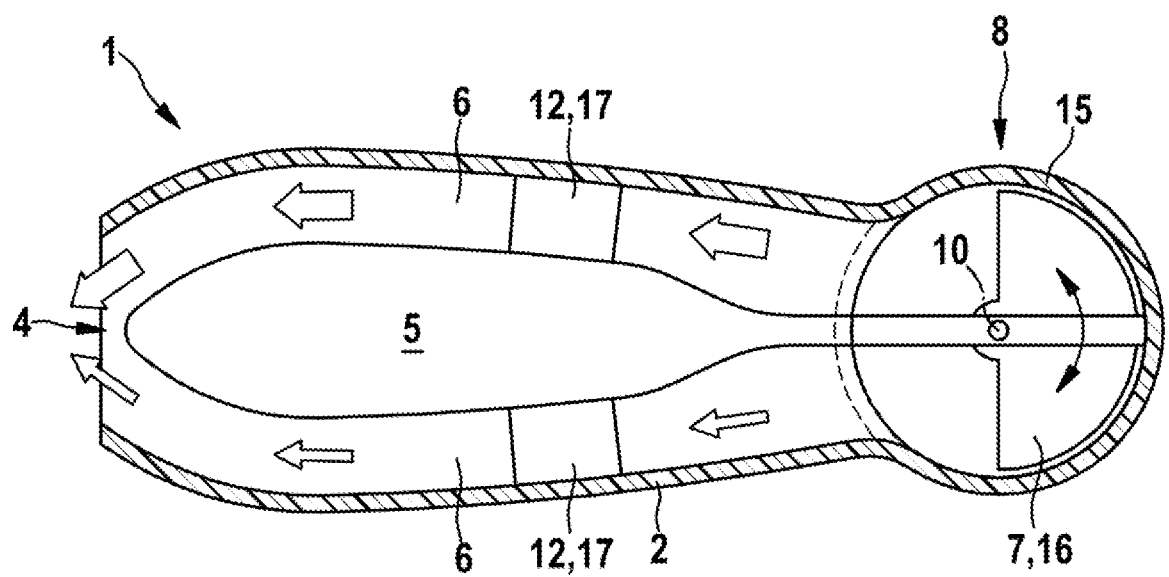
FIG. 4 shows an air vent in accordance with still another embodiment.

In FIG. 4, the housing 2 of the air vent 1 comprises two supply air ducts 15 on opposite sides, wherein only one of the two supply air ducts 15 is depicted in the figure, as the other supply air duct lies in front of the plane of the drawing. Each supply air duct 15 transitions into two air ducts 6, into which the air divider 5 divides the housing 2. Rotary vanes 16, serving as air quantity control elements 7, are disposed in the supply air ducts 15. By swiveling the rotary vanes 16, the ratio of the air quantities that flow through the two air ducts 6 and, therefore, the direction of an air flow out of the air outlet opening 4, can be controlled, as described with respect to FIGS. 1 to 3.

Fixed blades 17 are disposed in parallel to each other in the air ducts 6. The blades 17 are oriented at a slant in the direction of the center of the housing 2, i.e., the blades 17 are situated at a slant in one direction in one half of the housing 2 and, in another half of the housing 2, are situated at a slant in the opposite direction. Due to the fact that the air quantities that flow through the supply air ducts 15 from both sides into the air ducts 6 are controlled with the aid of the rotary vanes 16, the air flow from the air outlet opening 4 of the air vent 1 can be deflected at a slant toward the side: if the air flow in one half of the housing 2 is greater, the blades 17 situated at a slant toward the center deflect the air flow overall into the corresponding direction.

LIST OF REFERENCE CHARACTERS 1 air vent
2 housing
3 air inlet opening
4 air outlet opening
5 air divider
6 air duct
7 air quantity control element
8 air quantity controller
9 profiled element
10 swivel axis
11 swivelable blade
12 air guide device
13 air guide flap
14 sliding element
15 supply air channel
16 rotary vane
17 fixed blade

The invention claimed is:

1. An air vent comprising a housing, which comprises an air inlet opening, an air outlet opening, and an air divider which divides the housing into two air ducts, which extend at a slant toward each other in a direction of the air outlet opening, wherein:
    the air vent includes an adjustable air quantity controller in at least one of the two air ducts, by which an air quantity of an air flow through the air duct can be controlled;
    the air quantity controller comprises an air quantity control element that is movably coupled to the air divider, the air quality control element being movable in the at least one air duct to control the air flow therethrough; and
    a swivelable air guide is disposed in each of the two air ducts downstream of the air control element.

2. The air vent according to claim 1, wherein the air vent comprises an adjustable air quantity controller in both of the two air ducts.

3. The air vent according to claim 1, wherein the air vent comprises a swivelable and/or displaceable air quantity control element.

4. The air vent according to claim 1, wherein the air vent comprises a sliding element as the air quantity control element.

5. The air vent according to claim 1, wherein the swivelable air guide in each of the two air ducts is adjustable such that the air flow through the respective air ducts can be deflected at a second slant toward a side.

6. The air vent according to claim 1, wherein the housing is flat and wide transversely to a flow direction.

7. The air vent according to claim 1, wherein the air control element is selectively movable between at least a first position in which the air control element is in a first one of the two air ducts, and a second position in which the air control element is in a second one of the two air ducts.

8. The air vent according to claim 7, wherein the air divider extends from an upstream portion of the air divider to a downstream portion of the air divider in a direction of the air flow from the inlet opening to the outlet opening; and wherein the air control element is movably coupled to the upstream portion of the air divider.

9. The air vent according to claim 1, wherein the air divider has an airfoil profile.

* * * * *